United States Patent [19]

Dunn

[11] Patent Number: 5,224,326
[45] Date of Patent: Jul. 6, 1993

[54] LAWN MOWERS

[75] Inventor: Ken Dunn, Darlington, United Kingdom

[73] Assignee: Electrolux Northern Limited, Newton Aycliffe, United Kingdom

[21] Appl. No.: 686,752

[22] Filed: Apr. 17, 1991

[30] Foreign Application Priority Data

Apr. 17, 1990 [GB] United Kingdom ............... 9008571

[51] Int. Cl.⁵ ..................... A01D 34/82; A01D 5/00
[52] U.S. Cl. ................................ 56/12.8; 56/17.1; 56/320.2; 56/DIG. 8
[58] Field of Search ................... 56/121, 12.7, 12.8, 56/16.7, 17.1, DIG. 8, 320.1, 320.2

[56] References Cited

U.S. PATENT DOCUMENTS

| | | | |
|---|---|---|---|
| 2,485,984 | 10/1949 | Newman | 56/17.1 |
| 2,810,251 | 10/1957 | Shippey | 56/17.1 |
| 3,008,284 | 11/1961 | Bright | 56/320.2 |
| 3,452,523 | 7/1969 | Svensson | 56/12.8 |
| 3,512,344 | 5/1970 | Kortum | 56/17.1 X |
| 3,574,272 | 4/1971 | Krenson | 56/320.2 UX |
| 3,874,150 | 4/1975 | Boeck | 56/17.1 |
| 3,877,206 | 4/1975 | Cody et al. | 56/12.8 |
| 4,361,001 | 11/1982 | Almond et al. | 56/12.8 |
| 4,903,465 | 2/1990 | Hughes | 56/320.2 X |
| 5,010,716 | 4/1991 | Fassauer | 56/12.1 |
| 5,101,615 | 4/1992 | Fassauer | 56/12.8 |

FOREIGN PATENT DOCUMENTS

2302672 10/1976 France ................. 56/17.1

Primary Examiner—George A. Suchfield
Attorney, Agent, or Firm—Pearne, Gordon, McCoy & Granger

[57] ABSTRACT

This invention relates to rotary-type lawn mowers which may be supported on either a cushion of air (a hover mower) or on a wheeled/roller system. In more detail, a rotary mower according to the invention includes a hood, a cutting blade disposed within the hood and mounted for rotation about a substantially vertical axis, a power unit for driving the cutting blade in a cutting mode above the ground surface, at least one mower support rolling member disposed externally of that area ascribed during rotation of the cutting blade, a support lever rotatably supporting at least one rolling member mounted with its rotational axis of symmetry disposed crosswise and displaced longitudinally relative to the vertical axis of the cutting blade and with respect to normal forward operational movement of the mower, a device for hingedly connecting the support lever to a part of the mower at a position remote from the mower support rolling member whereby angular movement of the support lever about the rotational axis of the said rolling member creates displacement of the cutting blade relative to the ground surface to vary the height of cut of the cutting blade.

12 Claims, 8 Drawing Sheets

LAWN MOWERS

BACKGROUND OF THE INVENTION

1. Field of the Invention

This invention relates generally to lawn mowers and, more particularly to rotary lawn mowers having one or more cutting blades mounted for rotation during operation about a generally vertical axis.

2. Description of Related Art

Generally speaking, there are two main categories of rotary lawn mower, namely: (1) a hover-type rotary lawn mower which, when operative, is supported by a cushion of air, and (2) a rotary mower which is supported on wheels and which may include a rear roller for producing a striped effect on a lawn during mowing.

Mowers falling under category (1) are manually propelled by a user whereas mowers falling under category (2) may be either manually propelled by a user or propelled by a drive-line taken from a power unit connectable via a clutch to one or more wheels or a roller system. In the latter case the power unit combines the functions of driving the rotatable cutting blade(s) and the mower per se.

Mowers falling within either category may be driven by either an internal combustion engine or an electric motor.

The height of cut of mown grass using a mower falling within both categories is varied by raising or lowering the position of the cutting blade relative to ground surface. In the case of category (1) mowers, it is common practice to change the vertical position of the blade on its drive shaft by adding or removing spacer washers encircling the drive shaft and disposed between the cutting blade and an abutment on the drive shaft. In the case of category (2) mowers, it is known for each wheel to be carried on an associated lever system which, upon angular displacement, raises/lowers the axis of rotation of a wheel and, consequently, the position of the cutting blade relative to the ground surface.

Rotary lawn mowers and rotary grass cutting machines have, since their inception, revolutionized lawn and grass maintenance in both and commercial fields. One great advantage of rotary mowers when compared with conventional cylinder mowers is that damp or even wet grass is cut more easily with the former than the latter. Further, utilization of the hover principle of mowers falling within category (1) renders them very maneuverable.

Early models of each category of rotary mower did not include a facility for grass collection and, consequently, cut or mulched grass cuttings were deposited on a lawn. Further, rotary lawn mowers which do not possess a grass-collecting facility usually leave a row of grass-cuttings, a so called windrow, on a lawn and alongside each line of cut thereby leaving an untidy appearance on a mown lawn. Assignee of the present invention was among the pioneers in overcoming this problem, or at least greatly reducing the same, by producing a rotary mower which positively collects mown grass and other debris from a lawn by suction and directs the same into a collector. Since, as indicated, the windrow is normally in the form of a row of grass cuttings alongside each line of cut, the area to which suction need be applied can be restricted to coincide with that part of a mower which overlaps that region where a windrow is expected to be formed. Alternatively, the region of suction collection can be divided into a number of sub-regions disposed at least across the trailing edge or behind the trailing edge of the mower or, if desired, around the total periphery of the mower.

SUMMARY OF THE INVENTION

According to the present invention, a rotary mower comprises a hood, a cutting blade disposed with the hood and mounted for rotation about a substantially vertical axis, a power unit from driving the cutting blade in a cutting mode, above the ground surface, at least one mower support rolling member disposed externally of that area ascribed during rotation of the cutting blade, a support lever rotatably supporting at least one rolling member mounted with its rotational axis of symmetry disposed crosswise and displaced longitudinally relative to the vertical axis of the cutting blade and with respect to normal forward operational movement of the mower, means for hingedly connecting the support lever to a part of the mower at a position remote from the mower support rolling member whereby angular movement of the support lever about the rotational axis of the rolling member creates displacement of the cutting blade relative to the ground surface to vary the height of cut of the cutting blade.

Preferably, the support lever is hingedly connected to the hood. Conveniently, the mower includes a secondary lever which is attachable to the support lever in any one of a plurality of positions located intermediate the hinge connection and the rotatable support of the rolling member. In a specific form of mower, according to the invention, the secondary lever is a handle pivotally attachable to the support lever and engageable with at least one stop on the support lever whereby pivotal movement of the handle causes angular displacement of the support lever. The rotational axis of the rolling member is disposed behind, with respect to normal forward operational movement of the mower, of the vertical axis of rotation of the cutting blade. The rolling member serves to permit a hover mower made according to the invention to cut lawn edges bordering flower beds or the like since the roller produces continued support for the mower which would normally and otherwise be lost when air from a supporting air cushion escapes over the edge. In addition, as later described, the angular position of a handle is adjustable into a substantially horizontal attitude to allow a user to cut grass on a slope safely and without losing the benefit of the air cushion as additional support. Further, since the mower can be tilted by an operator, long grass can be cut in successive stages by displacing the front of the mower upwardly relative to the ground surface and about the rotational axis of the rolling member.

BRIEF DESCRIPTION OF THE DRAWINGS

Various embodiments of a rotary lawn mower in accordance with the present invention and compared with a known form of rotary mower will now be described by way of example with reference to the accompanying darwings in which:

FIG. 8b is an enlarged view of the switch plate 50 of FIG. 8a.

DETAILED DESCRIPTION OF THE PREFERRED EMBODIMENTS

Figure 1:
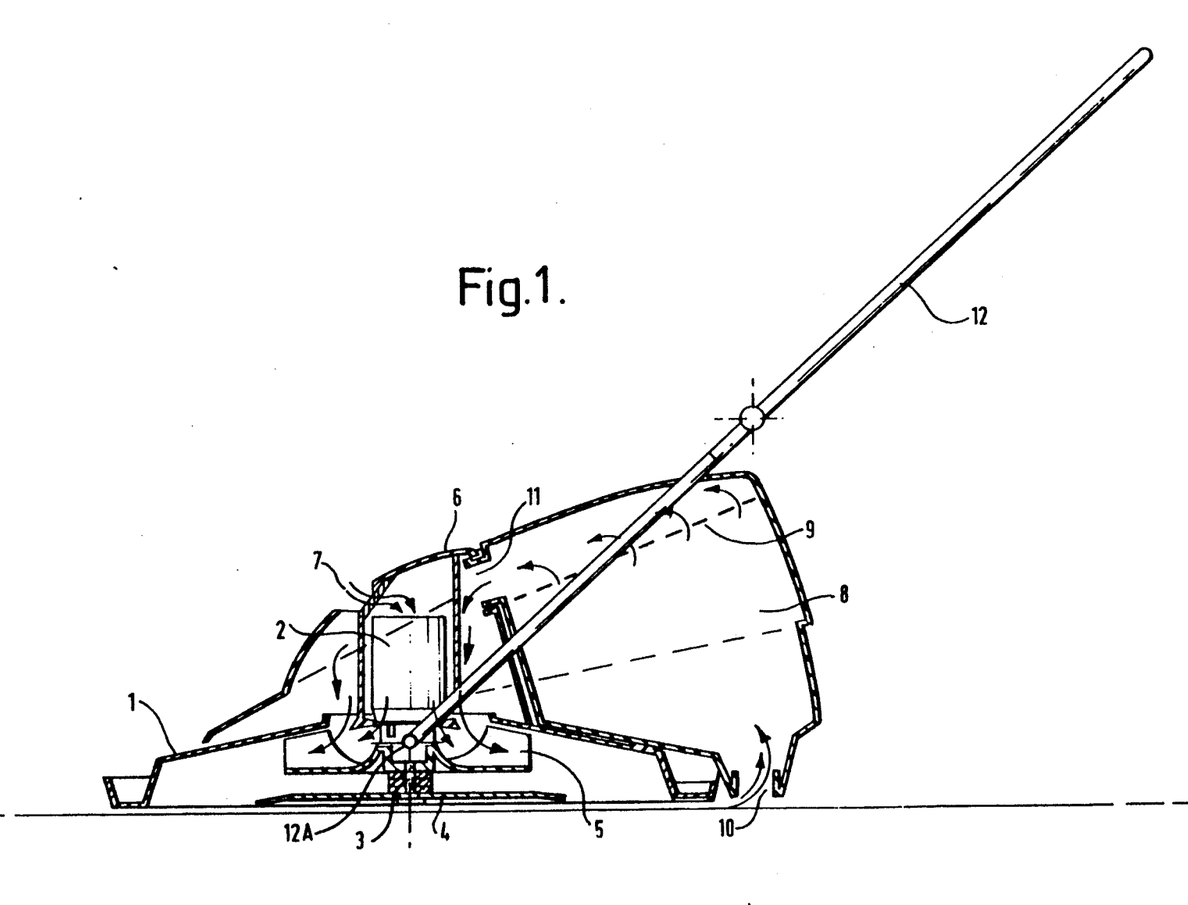
FIG. 1 is a longitudinal cross-sectional view of a known form of rotary lawn mower.

Referring to FIG. 1, a hood 1 in the form of an inverted dish supports an electic motor 2 having a drive shaft 3 on which is mounted a rotatable cutting blade 4 and an impeller 5. The electric motor 2 is shrouded within a cover 6 including one or more inlet apertures 7 for ambient air. A grass box 8 is supported on the hood 1 as shown and includes a filter grid 9, an inlet for grass cuttings 10 and an air outlet 11. In use, air is drawn through inlet apertures 7 by the impeller 5 to create a cushion of air to support the mower. In addition air is drawn into the grass box by operation of the impeller through inlet 10, grid 9 and air outlet 11. The suction created within the grass box draws grass cuttings and other debris into the box through inlet 10. A handle 12 is hingedly connected to the hood at its lower end 12A and in substantial crosswise alignment with the vertical axis of the electric motor drive shaft 3.

Figure 2:
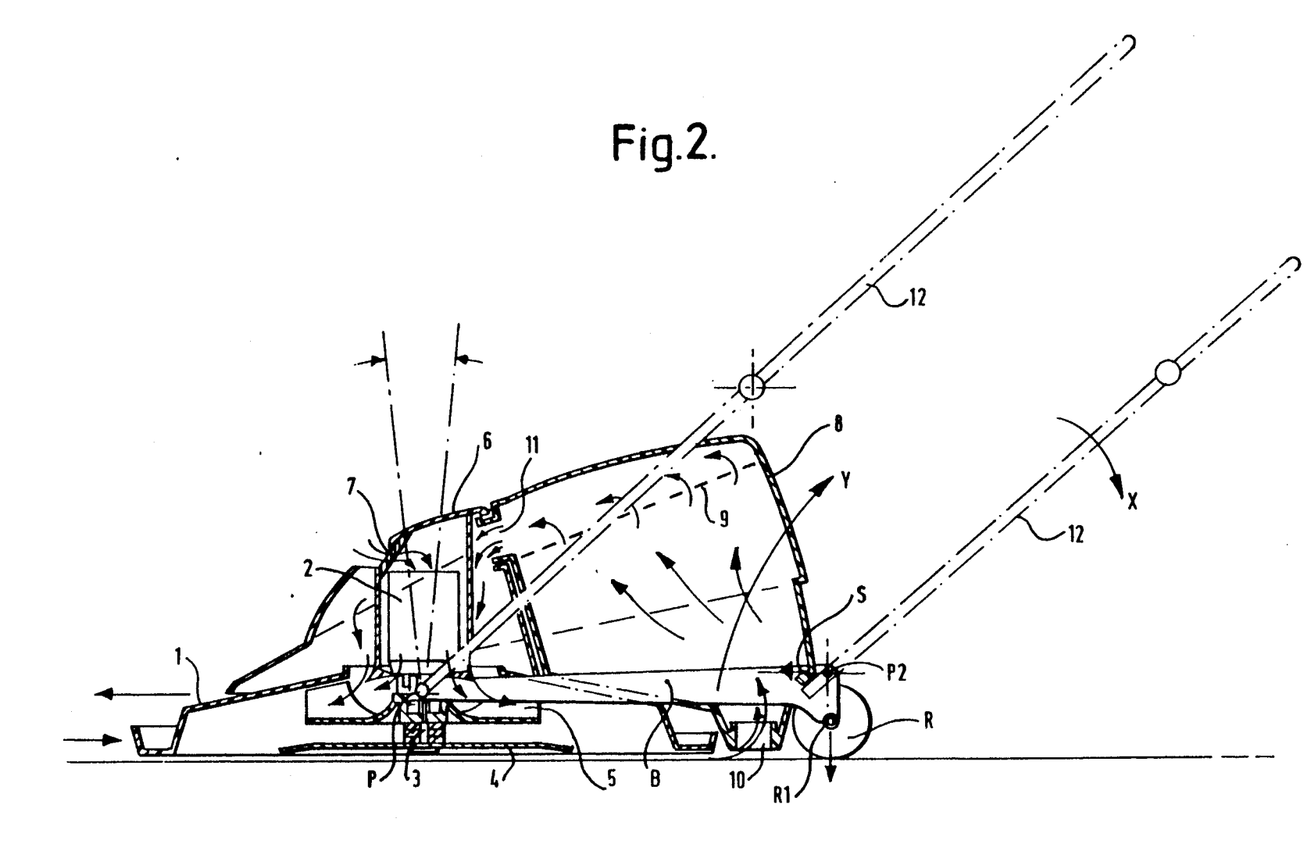
FIG. 2 is a longitudinal cross-sectional view of another embodiment of a lawn mower in accordance with the present invention.

Referring to FIG. 2, where like components are designated with the same reference numbers as FIG. 1, in addition to being supported in operation by a cushion of air, the mower shown is also supported by a rear roller R which is carried on a pair of laterally displaced support levers or booms B (of which one is shown) and which are hingedly supported on the hood 1 at points P. The points P are located in substantially crosswise alignment with the vertical axis of the electric motor drive shaft 3 and generally coincide with the hinge connection of the handle 12 and hood 1 as shown in the embodiment of FIG. 1. In the embodiment of FIG. 2 the secondary lever or handle 12 is moved rearwardly when compared with the handle of the embodiment of FIG. 1 and is pivotally connected to each boom at point P2. Naturally, the secondary lever or handle 12 can be connected to the support lever or boom B at any position between the points P and P2, having the handle attach to the boom at location P2 merely being the illustrated embodiment. Angular displacement of the handle 12 in the direction of arrow X is restrained by a stop S carried on each boom. From FIG. 2 it will be seen that movement of the handle 12 in the direction of arrow X causes the booms to be displaced in the direction of arrow Y about axis R1 of the roller R, thereby varying the position of the cutting blade 4 relative to ground datum and, consequently, the height of cut of grass. The cushion of air upon which the mower is generally supported serves to assist in maintaining the cutting blade 4 in a generally horizontal attitude irrespective of the vertical position of the hood as determined by the angular movement of the booms B.

Figure 3:
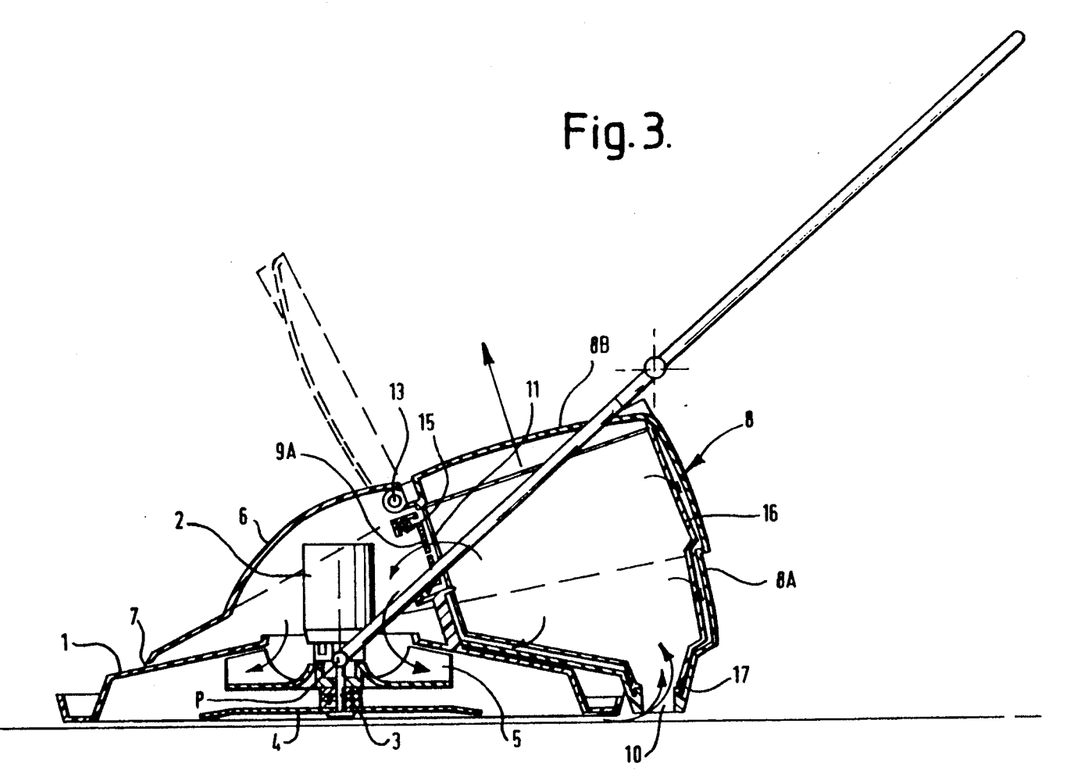
FIG. 3 is a longitudinal cross-sectional view of another embodiment of a lawn mower in accordance with the present invention.

Refering now to FIG. 3 where the support levers or booms and rear roller R have, for clarity, been omitted, the grass box 8 is divided into two parts 8A and 8B. The part 8B constitutes a lid hinged to the cover 6 at 13 to permit access into part 8A. The air outlet 11 of the grass box communicates with air spaces leading to the impeller 5 via a filter 9A which is sealingly secured to a tubular flexible sealing meber 15. In this particular embodiment, grass cuttings and debris are collected as in the embodiments of FIGS. 1 and 2 via inlet 10 and into a removable or disposable container 16 which is supported in spaced relationship relative to part 8A of the grass box by internal ribs or projections, not shown. In order to ensure an adequate seal between the container 16 and the inlet 10, a sealing gasket 17 is carried either by the container or the collector part 8A, as indicated.

Figure 4:
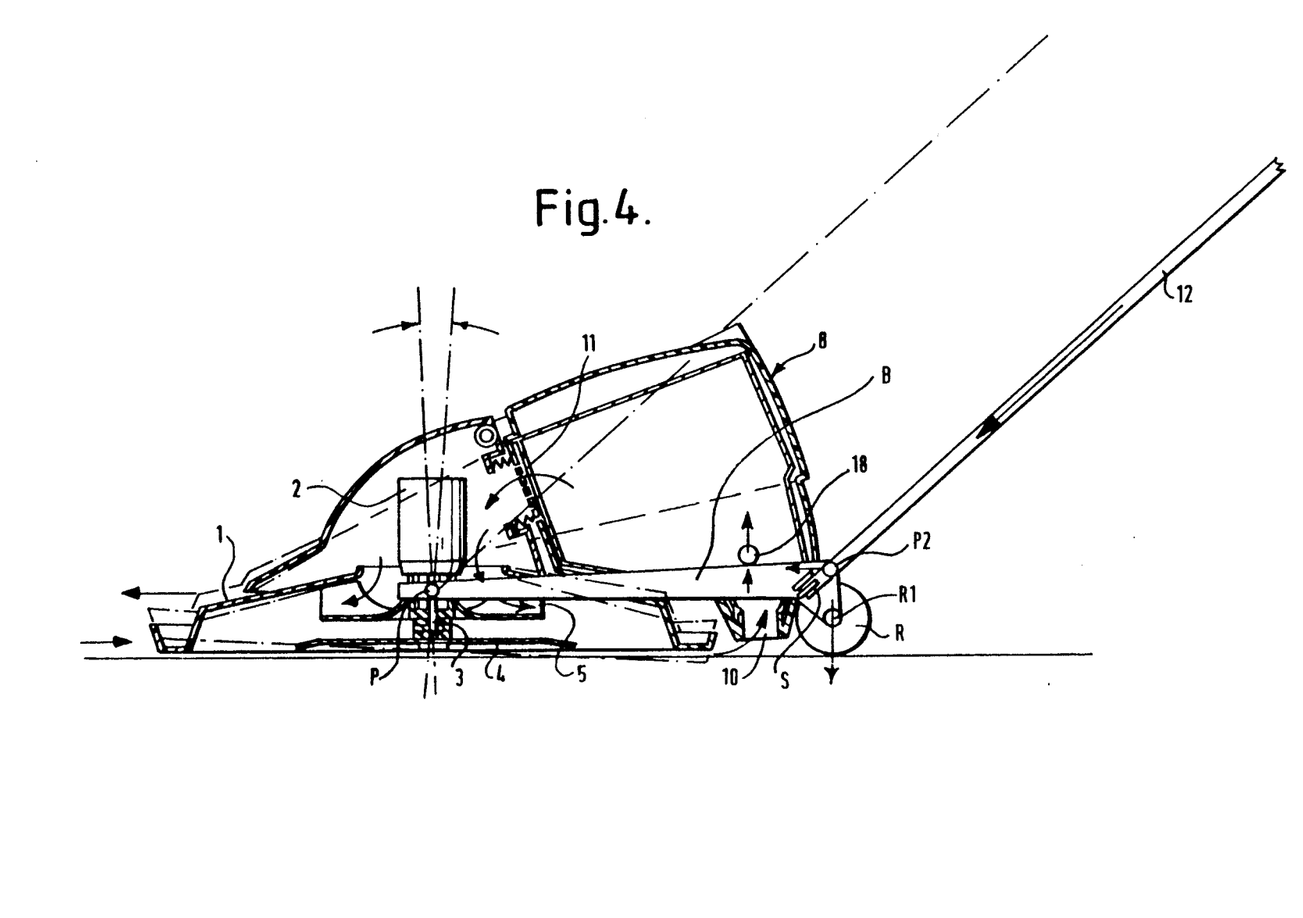
FIG. 4 is a longitudinal cross-sectional view of another embodiment of a lawn mower in accordance with the present invention.

FIG. 4 shows an embodiment of similar construction to that of FIG. 3, illustrating the support levers or booms B supporting rear roller R and modified so that the grass box is supported wholly or in part by the booms B via stops 18 carried by the grass box 8. It will be seen from FIG. 4 that the lower end of the secondary lever or handle 12 is slotted at S for ease of removal from the machine after extraction of pivot pins at P2 from the booms B.

Figure 5:
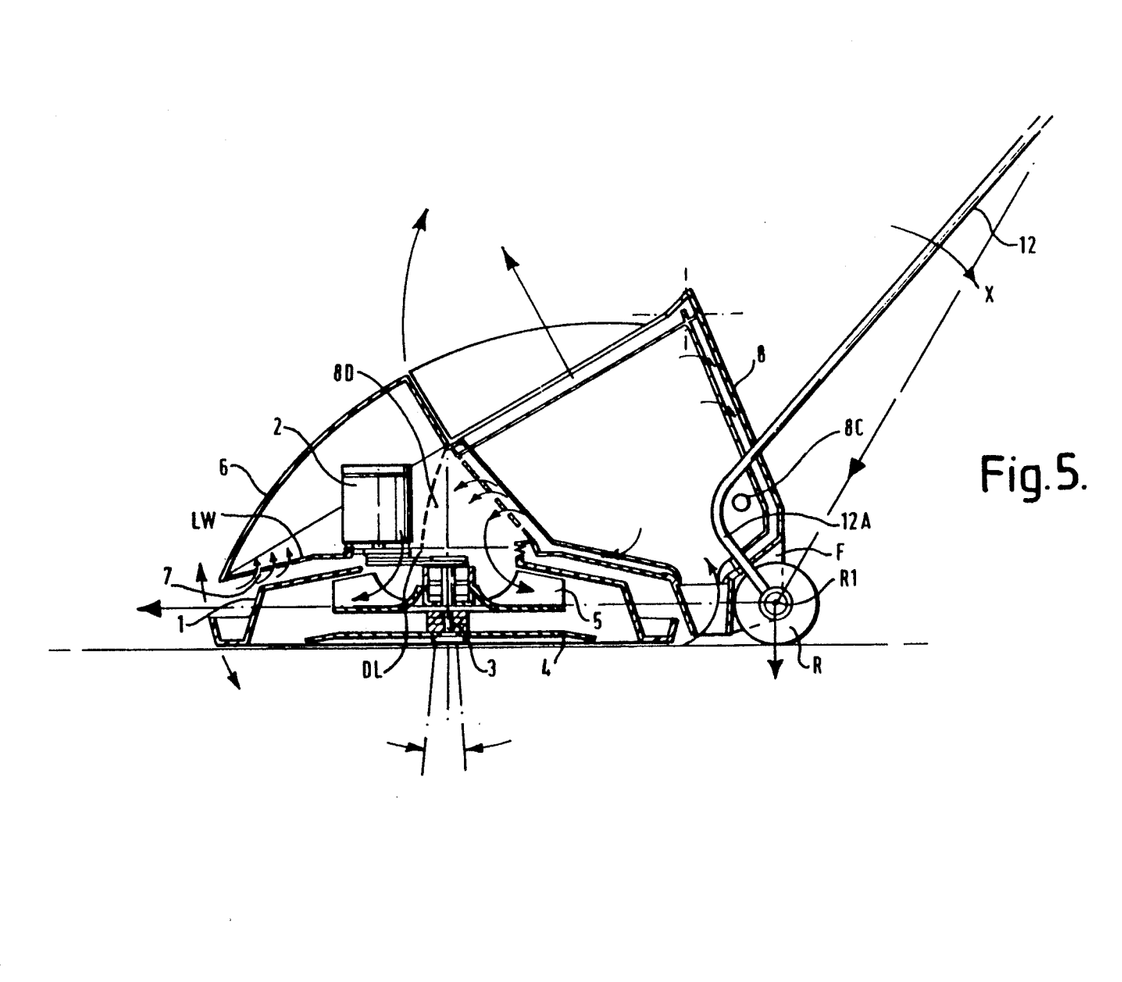
FIG. 5 is a longitudinal cross-sectional view of another embodiment of a lawn mower in accordance with the present invention.

Referring now to FIG. 5, the electric motor 2 is located forwardly of axis 3A of the impeller 5 and cutting blade 4 which are together driven by a drive line, e.g. belt, gears or the like, DL. In this particular embodiment the inlet apertures 7 are disposed in a lower wall LW of the cover 6. The roller R is rotatably mounted in flanges F formed integrally with the grass box 8 and the handle 12 is rotatably mounted on the axis R1 of the roller. From FIG. 5 it will be seen that the secondary lever or handle 12 is cranked with part 12A engageable with abutment 8C. The grass box 8 also includes forwardly extending checks 8D which are pivotted to the hood 1 in alignment with the vertical axis of the cutting blade and corresponding to pivot P of FIG. 2. Thus, the grass box constitutes the equivalent of support levers or booms B in the embodiments of FIGS. 2, 3 and 4 and angular movement of the handle 12 about axis R1 of the roller R, as restrained by a retractable stop 8C, causes angular displacement of the hood 1 and, consequently, the position of the cutting blade 4 to vary the height of cut of grass to be mown.

Figure 6:
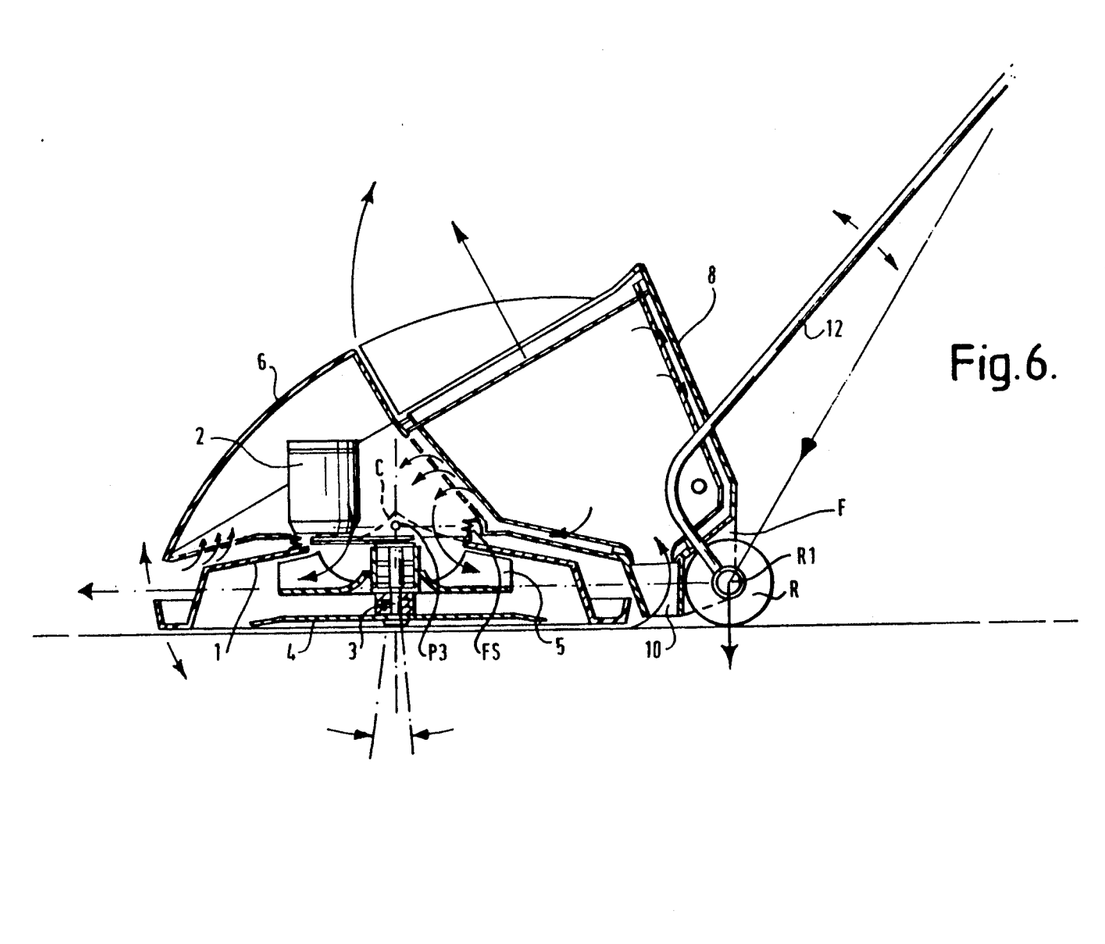
FIG. 6 is a longitudinal cross-sectional view of another embodiment of a lawn mower in accordance with the present invention.

Referring to FIG. 6, it will be seen that the grass box 8 and cowling 6 are formed integrally with each other and constitute a superstructure. In this embodiment, the roller R is pivotally supported in the flange F in the same way as shown in FIG. 5. The integral grass box 8 and cover 6 combination is pivotally moveable about pivot pin(s) P3 supported from the hood 1 and engageable with cut-outs C formed in an underside region of the combination. The hood 1 and motor 2 assembly are together, therefore, pivotably mounted relative to the integral superstructure and a flexible seal-collar FS is mounted therebetween.

Figure 7:
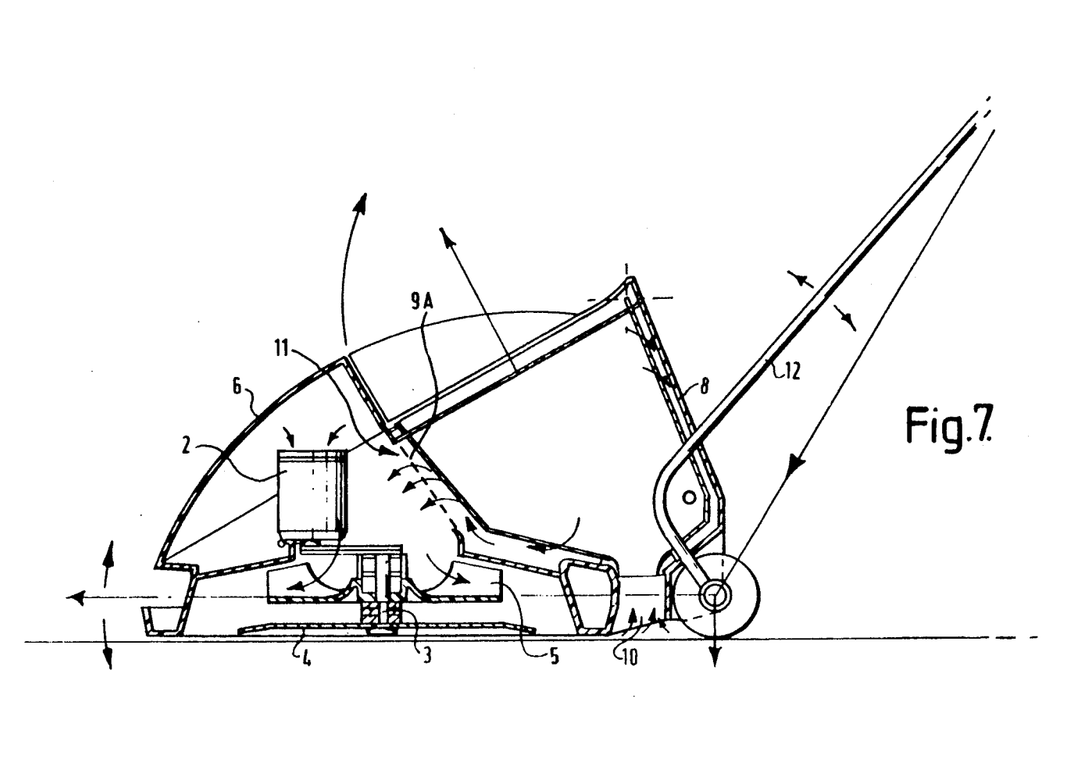
FIG. 7 is a longitudinal cross-sectional view of another embodiment of a lawn mower in accordance with the present invention.

The embodiment of FIG. 7 shows yet a further embodiment in which the hood 1, cover 7, grass box 8 and motor mounting constitute an integrally moulded or cast unit. Corresponding components are again designated with the same numbers used in other figures. Access for assembling the motor 2, drive line DL, impeller 5 and blade 4 is via aperture 11 prior to fitting or removal of the filter 9A.

Figure 8A:
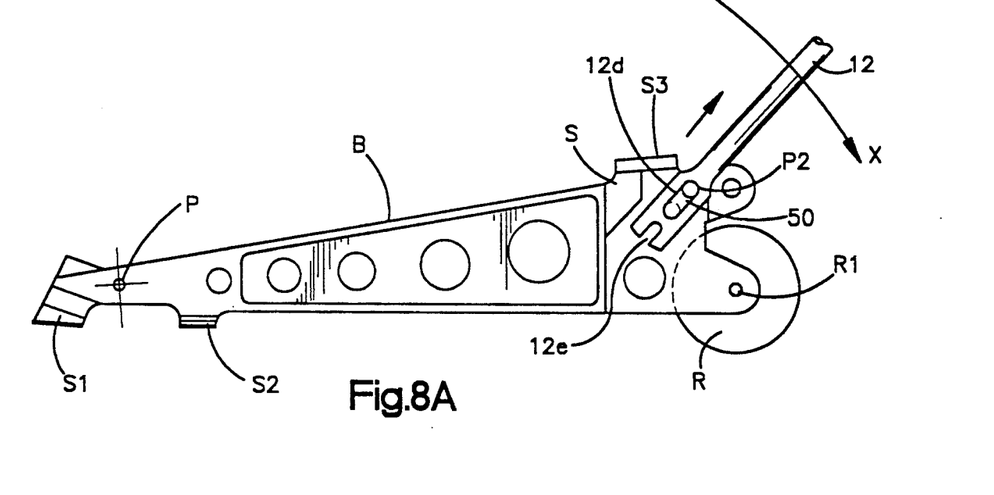
FIG. 8a is an enlarged view of a support lever.

FIG. 8a shows a particular form of a support lever or boom B for use in connection with mowers according to the present invention. The boom B may be made from metal or a plastics material. Pivotal movement of the boom B relative to pivot point R1 (which movement also determines the height of cut or mown grass) is determined by two stops S1, S2 which cooperate with corresponding stops on the hood 1, not shown. The roller R is rotationally mounted at R1 on the boom in a manner as previously described.

Figure 8B:
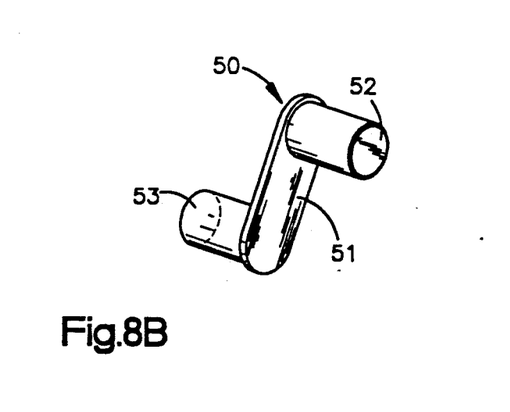

The secondary lever or handle 12 is slotted at 12D and has a forked end 12E. In the position shown a stop S serves during contact with the lower end of the handle when displaced in the direction of arrow X to angularly displace the boom in the direction of arrow Y (see FIG. 2) as previously described. Also, in the position shown, it will be seen that pivot P2 is in engagement with the uppermost portion of the slot 12D and is retained in that position by an insert or switch plate 50, shown in FIG. 8b. The switch plate 50 has an arm 51 and two displaced and oppositely directed spigots 52/53. In use, one spigot is located in a hole formed in the boom B in a position in the region of the lowermost position of the slot 12D, and the other spigot constitutes the pivot P2 for the handle. Removal and replacement of the handle so that the forked end 12E engages the upper spigot (or pivot P2) enables a user to turn the handle 12 in the direction of arrow X without engaging the stop S and into engagement with a further stop S3. In this position the handle is disposed in a substantially horizontal attitude which permits a user to operate the mower relatively easily on sloping ground.

The use of a rear roller hingedly connected to the hood serves not only to support the weight of the mower generally and grass collected in the grass box, but more importantly serves, especially in connection with embodiments of FIGS. 4 and 5, to transfer the whole of the vertical component of the weight of the mower to pass vertically through the axix R1 of the roller R.

I claim:

1. A rotary mower comprising a hood, a cutting blade disposed within the hood and mounted for rotation about a substantially vertical axis, a power unit for driving the cutting blade in a cutting mode above a ground surface, at least one mower support rolling member disposed externally of that area ascribed during rotation of the cutting blade, a support lever rotatably supporting said at least one rolling member mounted with its rotational axis of symmetry disposed crosswise and displaced rearwardly relative to normal cutting mode with respect to normal forward operational movement of the mower, means for hingedly connecting the support lever to a part of the mower at a position remote from the mower support rolling member means operatively connecting said support lever and said roller so that angular movement of the support lever about the rotational axis of the said rolling member while said cutter is operating creates displacement of the cutting blade relative to ground surface to vary the height of cut of the cutting blade.

2. A mower according to claim 1 wherein the support lever is hingedly connected to the hood.

3. A rotary mower comprising a hood, a cutting blade disposed within the hood and mounted for rotation about a substantially vertical axis, a power unit for driving the cutting blade in a cutting mode above a ground surface, at least one blade and support rolling member disposed externally of that area ascribed during rotation of the cutting blade, a support lever rotatably supporting said at least one rolling member mounted with its rotational axis of symmetry disposed crosswise and displaced rearwardly relative to normal cutting mode with respect to normal forward operational movement of the mower, means for hingedly connecting the support lever to a part of the mower at a position remote from the mower support rolling member whereby angular movement of the support lever about the rotational axis of the said rolling member creates displacement of the cutting blade relative to ground surface to vary the height of cut of the cutting blade, said support lever being hingedly connected to the hood, said mower including a secondary lever attached to the support lever in any one of a plurality of positions located intermediate the hinge connection and the rotatable support of the rolling member.

4. A mower according to claim 3 wherein the secondary lever is a handle pivotally attachable to the support lever and engageable with at least one stop on the support lever whereby pivotal movement of the handle causes angular displacement of the support lever.

5. A mower according to claim 3 wherein the hinge connection between the support lever and the hood is disposed in alignment with the vertical axis of rotation of the cutting blade.

6. A mower according claim 5 wherein the rotational axis of the said rolling member is disposed behind, with respect to normal forward operational movement of the mower, of the vertical axis of rotation of the cutting blade.

7. A mower according to claim 6 wherein the said rolling member is disposed externally of the hood.

8. A mower according to claim 7 wherein the said rolling member has an axial length at least equal to the diameter of the cutting blade and is disposed substantially symmetrically relative to a front to rear center line of the mower which passes longitudinally through the vertical axis of the cutting blade.

9. A rotary mower comprising a hood, a cutting blade disposed within the hood and mounted for rotation about a substantially vertical axis, a power unit for driving the cutting blade in a cutting mode above a ground surface, at least one blade and support rolling member disposed externally of that area ascribed during rotation of the cutting blade, a support lever rotatably supporting said at least one rolling member mounted with its rotational axis of symmetry disposed crosswise and displaced rearwardly relative to normal cutting mode with respect to normal forward opertional movement of the mower, means for hingedly connecting the support lever to a part of the mower at a position remote from the mower support rolling member means operatively connecting said support lever and said roller so that angular movement of the support lever about the rotational axis of the said rolling member creates displacement of the cutting blade relative to ground surface to vary the height of cut of the cutting blade including a grass collector, the collector including integral elements for rotatably supporting the rolling member and hingedly connecting the collector to the hood, the said collector and integral elements constituting the support lever.

10. A mower according to claim 9 including a handle pivotally carried on the axis of rotation of the rolling member and attachable to the grass collector for angularly displacing the hood together with the cutting blade relative to the said axis of rotation.

11. A rotary mower comprising a hood, a cutting blade disposed within the hood and mounted for rotation about a substantially vertical axis, a power unit for driving the cutting blade in a cutting mode above a ground surface, at least one mower support rolling member disposed externally of that area ascribed during rotation of the cutting blade, a support lever rotatably supporting said at least one rolling member mounted with its rotational axis of symmetry disposed crosswise and displaced rearwardly relative to normal cutting mode with respect to the vertical axis of the cutting blade and with respect to normal forward operational movement of the mower, means for hingedly connecting the support lever to a part of the mower at a position in substantial alignment with the vertical axis of rotation of the cutting blade whereby angular movement of the support lever about the rotational axis of the said rolling member creates displacement of the cutting blade relative to ground surface to vary the height of cut of the cutting blade.

12. A rotary mower comprising a hood, a cutting blade disposed within the hood and mounted for rotation about a substantially vertical axis, a power unit for driving the cutting blade in a cutting mode above a ground surface, at least one mower support rolling member disposed externally of that area ascribed during rotation of the cutting blade, a support lever rotatably supporting said at least one rolling member mounted with its rotational axis of symmetry disposed crosswise and displaced rearwardly relative to normal cutting mode with respect to the vertical axis of the cutting blade and with respect to normal forward operational movement of the mower, the support lever comprising first and second leverage elements forming a cranked support lever, means for supporting the said at least one rolling member on one leverage element, the mower including a fulcrum support disposed at a position whereby initial angular movement of the cranked support lever about the rotational axis of the said rolling member results in contact with the fulcrum support and further angular movement creates displacement of the mower about the said rotational axis to displace the cutting blade relative to the ground surface to vary the height of cut of the cutting blade.

* * * * *